United States Patent [19]

Granzow et al.

[11] 4,255,324
[45] Mar. 10, 1981

[54] SYNERGISTIC FLAME RETARDANT COMPOSITIONS FOR POLYPHENYLENE ETHER RESINS

[75] Inventors: Albrecht H. Granzow, Somerset; Christos Savides, Piscataway, both of N.J.

[73] Assignee: American Cyanamid Company, Stamford, Conn.

[21] Appl. No.: 86,210

[22] Filed: Oct. 18, 1979

[51] Int. Cl.³ ............................................. C08K 5/53
[52] U.S. Cl. ........................ 260/45.85 T; 260/45.7 P; 260/45.8 R; 260/45.9 KA
[58] Field of Search ............... 260/45.7 P, 45.8 R, 260/45.85 T, 45.9 KA

[56] References Cited

U.S. PATENT DOCUMENTS

| | | | |
|---|---|---|---|
| 3,269,963 | 8/1966 | Ilgemann et al. | 260/45.7 P |
| 3,284,543 | 11/1966 | Gillham et al. | 260/45.7 P |
| 3,341,625 | 9/1967 | Gillham et al. | 260/45.9 KA |
| 3,532,668 | 10/1970 | Savides | 260/45.8 A |
| 3,917,560 | 11/1975 | Hoffman | 260/45.9 KA |
| 3,922,323 | 11/1975 | Reese et al. | 260/45.8 R |
| 3,931,104 | 1/1976 | Luders et al. | 260/45.9 KA |
| 4,017,455 | 4/1977 | Hoffman | 260/45.85 T |
| 4,064,104 | 12/1977 | Mrowca | 260/45.7 P |
| 4,098,759 | 7/1978 | Noetzel et al. | 260/45.8 R |
| 4,162,278 | 7/1979 | Granzow | 260/45.7 P |

Primary Examiner—Hosea E. Taylor
Assistant Examiner—R. A. White
Attorney, Agent, or Firm—Bruce F. Jacobs

[57] ABSTRACT

Polyphenylene ether resin compositions are flame retarded by using a combination of a phosphine oxide and a phosphonate in a weight ratio of about 1:3 to 3:1.

13 Claims, No Drawings

SYNERGISTIC FLAME RETARDANT COMPOSITIONS FOR POLYPHENYLENE ETHER RESINS

The present invention relates to synergistic flame retardant compositions for polyphenylene ether resins. More particularly, it relates to synergistic combinations of certain phosphine oxide and phosphonate compounds and to their use as flame retardants for polyphenylene ether resins.

In accordance with the present invention, combinations of certain phosphine oxide compounds with certain phosphonate compounds provide flame retardant polyphenylene ether resin compositions at lower concentrations than is obtained by the use of either component of the combination alone.

The useful phosphine oxide compounds are represented by Formula I:

  (I)

wherein $R^1$ and $R^2$ are each selected from alkyl (6 to 12 carbon atoms, cycloalkyl (5 to 8 carbon atoms), phenyl, halophenyl (1 to 3 halogen atoms especially chlorine or bromine), omega-cyanoalkyl (1 to 4 carbon atoms), and benzyl; and Formula II:

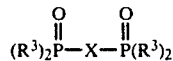  (II)

wherein each $R^3$ is selected from cycloalkyl (5 to 8 carbon atoms), and omega-cyanoalkyl (1 to 4 carbon atoms) and wherein X is selected from:

(a)

wherein n is an integer from 1 to 6;

(b) the group

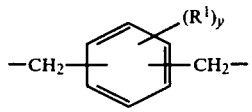

wherein R' is alkyl of 1 to 4 carbon atoms, and y is an integer from 0 to 4: and (c) the group

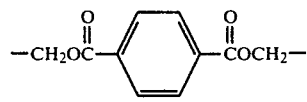

Preferred species of Formula I include:
Tris(2-cyanoethyl)phosphine oxide
Tris(benzyl)phosphine oxide
Triphenylphosphine oxide
Tris(p-chlorophenyl)phosphine oxide
Tris(n-octyl)phosphine oxide
Benzylbis(2-cyanoethyl)phosphine oxide
Benzylbis(cyclohexyl)phosphine oxide
Preferred species of Formula II include:
Bis[(dicyclohexylphosphinyl)methyl]terephthalate
Ethylenebis[bis(2-cyanoethyl)phosphine oxide]
2,3,5,6-Tetramethyl-1,4-xylylenebis[bis-(2-cyanoethyl)-phosphine oxide]

Compounds represented by Formula I are disclosed as flame retardants for polyphenylene ether resins in commonly assigned copending application, U.S. Ser. No. 078,531, filed Sept. 24, 1979; those of Formula II in copending application, U.S. Ser. No. 078,533, filed Sept. 24, 1979, and U.S. Ser. No. 078,534, filed Sept. 24, 1979.

The useful phosphonate compounds are represented by Formula III:

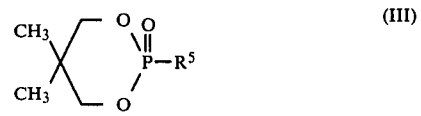  (III)

wherein $R^5$ is selected from phenyl, benzyl, and alkylbenzyl (1 to 3 alkyl groups each containing 1 to 4 carbon atoms); and Formula IV:

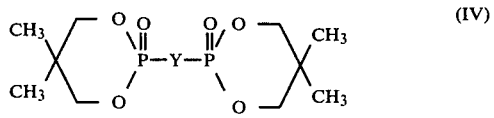  (IV)

wherein Y is xylylene or alkyl substituted xylylene, preferably where the methylene groups are para.

Preferred phosphonates of Formula III include:
Benzyl neopentylene phosphonate
Phenyl neopentylene phosphonate
2,4,6-Trimethylbenzyl neopentylene phosphonate
Preferred phosphonates of Formula IV include:
(p-Phenylenedimethylene)bis[2,2-dimethyltrimethylenephosphonate]
(2,5-Dimethyl-1,4-phenylenedimethylene)-bis[2,2-dimethyltrimethylene phosphonate]

Compounds represented by Formula III are described as flame retardants for polyphenylene ether resins in commonly assigned, copending application, U.S. Ser. No. 042,832, filed May 25, 1979; compounds represented by Formula IV are described in copending application U.S. Ser. No. 079,689, filed Sept. 28, 1979, which is a continuation-in-part of U.S. Ser. No. 700,996, filed June 29, 1976, now abandoned.

The polyphenylene ether resins, which are flame retarded by the combinations of the invention, may be prepared as described in U.S. Pat. No. 4,024,093, incorporated herein by reference. In particular, the polyphenylene ether resins for which the compounds are useful are rubber-modified polyphenylene ether resins comprising about 10 to 90 parts by weight of polyphenylene ether, preferably 20 to 70 parts by weight, and about 90 to 10 parts by weight, preferably 80 to 30 parts by weight, of a rubber-modified, high-impact polystyrene. Still more preferably, the resins are about 50/50 weight blends of polyphenylene ether and rubber-modified impact polystyrene. Blends of polyphenylene ether resin and rubber-modified, high-impact polystyrene, having greater than 50% polyphenylene ether content, may require somewhat less than 4% by weight of the flame retardant composition of the invention. The resins are blends of the two polymers, which are mutually soluble, to form a homogeneous polymer composition.

The flame retardant combinations of the invention are used in the polymer in an effective amount. Generally an effective amount is at least about 4% by weight. The ratio of phosphine oxide compound to phosphonate, by weight, ranges from about 3/1 to ⅓, preferably about 1/1.

The flame retardant combination may be added to the polymer by any known method, such as by milling on a two-roll plastic mill or in a Banbury mixer, by dry blending with polymer and extruding, and the like.

It is also within the scope of the invention to incorporate such other ingredients into the polymer as plasticizers, dyes, pigments, heat and light stabilizers, antioxidants, antistatic agents, and the like.

The following examples further illustrate the invention. All parts are by weight unless otherwise specified.

EXAMPLES 1-5

A total of 10 g of a 50/50 blend of polyphenylene ether/rubber-modified impact polystyrene containing the flame retardant was dry blended and extruded through a melt index apparatus (described in ASTM D-1238) at 290°-300° C. The cylindrical extrudate, 3-5 inches in length and 0.25 inch in diameter, is subjected to the following flammability test procedure described in Underwriters' Laboratories Test UL 94, Vertical Test Method 3.10-3.15 (September, 1973). The above polymer sample, clamped in a vertical position, is ignited, with a ¾-inch blue flame (methane or natural gas) for 10 seconds, and the flame is withdrawn. If the flame is extinguished within 25 seconds, it is ignited again for 10 seconds, and the flame is withdrawn. The flame extinguishment time is again recorded. If the flame extinguishment time does not exceed 5 seconds for either flame application, the sample is rated V-0. If the flame extinguishment time for either the first or second flame application is between 5 and 25 seconds, it is rated V-1. If a sample shows extinguishment time greater than 25 seconds for either flame application, it is rated "free-burning" (FB), and it is considered as failing by this test.

Table I shows the data obtained with tris(2-cyanoethyl)phosphine oxide (A) and benzyl neopentylene phosphonate (B).

TABLE I

Evaluation of Tris(Cyanoethyl)Phosphine Oxide/Benzyl Neopentylene Phosphonate Combination as Flame Retardant in Polyphenylene Ether

| Example | Phosphine Oxide | Phosphonate | Flammability Rating |
|---|---|---|---|
| 1 | 4% A | — | FB |
| 2 | — | 4% B | FB |
| 3 | 2% A | 2% B | V-0 |
| 4 | 1% A | 3% B | V-1 |
| 5 | 3% A | 1% B | V-1 |

Whereas 4% by weight of either compound alone is "free-burning" (inactive), combinations of the two compounds in ratios of 1:3, 2:2 and 3:1, at a total concentration of 4%, are effective flame retardants.

EXAMPLES 6-33

Following the procedure of Examples 1-5, combinations of phosphine oxides and phosphonates were evaluated as flame retardants. The following compounds were tested:

A. Tris(2-cyanoethyl)phosphine oxide
B. Benzyl neopentylene phosphonate
C. Phenyl neopentylene phosphonate
D. (p-Phenylenedimethylene)bis[2,2-dimethyltrimethylene phosphonate]
E. (2,5-Dimethyl-1,4-phenylenedimethylene)-bis[2,2-dimethyltrimethylene phosphonate]
F. 2,4,6-Trimethylbenzyl neopentylene phosphonate
G. Tris(benzyl)phosphine oxide
H. Triphenylphosphine oxide
J. Tris(p-chlorophenyl)phosphine oxide
K. Tris(n-octyl)phosphine oxide
L. Benzylbis(cyclohexyl)phosphine oxide
M. Bis[(dicyclohexyl phosphinyl)methyl]terephthalate
N. Ethylenebis[bis(2-cyanoethyl)phosphine oxide]
O. (2,3,5,6-Tetramethyl-1,4-phenylenedimethylene)bis[bis(2-cyanoethyl)phosphine oxide]
P. Benzylbis(2-cyanoethyl)phosphine oxide

TABLE II

| Example | Phosphine Oxide | Phosphonate | Flammability Rating |
|---|---|---|---|
| 6 | — | 4% C | FB |
| 7 | 2% A | 2% C | V-1 |
| 8 | — | 6% D | FB |
| 9 | 2% A | 2% D | V-1 |
| 10 | — | 4% E | FB |
| 11 | 2% A | 2% E | V-1 |
| 12 | — | 4% F | V-1* |
| 13 | 2% A | 2% F | V-0** |
| 14 | 4% G | — | FB |
| 15 | 2% G | 2% B | V-1 |
| 16 | 4% H | — | FB |
| 17 | 2% H | 2% B | V-1 |
| 18 | 4% J | — | FB |
| 19 | 2% J | 2% B | V-1 |
| 20 | 4% K | — | FB |
| 21 | 2% K | 2% B | V-1 |
| 22 | 4% L | — | FB |
| 23 | 2% L | 2% B | V-0 |
| 24 | 4% M | — | FB |
| 25 | 2% M | 2% B | V-1 |
| 26 | 4% N | — | FB |
| 27 | 2% N | 2% B | V-1 |
| 28 | 4% O | — | FB |
| 29 | 2% O | 2% B | V-1 |
| 30 | — | 4% C | FB |
| 31 | 2% G | 2% C | V-1 |
| 32 | 4% P | — | FB/V-1 |
| 33 | 2% P | 2% C | V-1/V-0 |

*Average time to extinguishment - 15 sec.
**Average time to extinguishment - 3 sec.

The data illustrate that whereas individual phosphine oxides or phosphonates of the invention are not active flame retardants for the polyphenylene ether resins at a level of about 4%, the combinations of this invention at the same concentration are effective flame retardants.

What is claimed is:

1. A flame retardant composition comprising a homogeneous blend of polymers containing about 10 to 90 parts by weight of polyphenylene ether resin, about 90 to 10 parts by weight of polystyrene, and a flame-retarding effective amount of a mixture of (A) a phosphine compound (I):

$$(R^1)_2PR^2 \overset{O}{\underset{\|}{}}$$

wherein $R^1$ and $R^2$ are each selected from alkyl of 4 to 12 carbon atoms, cycloalkyl of 5 to 8 carbon atoms, phenyl, halophenyl containing 1 to 3 halogen atoms, omega-cyanoalkyl containing 1 to 4 carbon atoms, and benzyl; or (II):

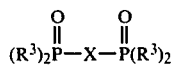

wherein $R^3$ is selected from cycloalkyl of 5 to 8 carbon atoms or omega-cyanoalkyl of 1 to 4 carbon atoms, and X is selected from (a)

wherein n is an integer from 1 to 6;

(b) the group

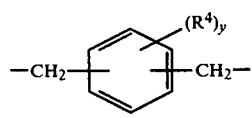

wherein $R^4$ is alkyl of 1 to 4 carbon atoms and y is an integer from 0 to 4; and (c) the group

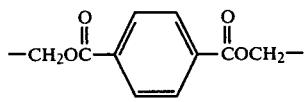

and (B) a phosphonate compound (III):

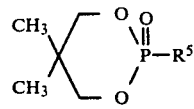  (III)

wherein $R^5$ is selected from phenyl, benzyl, or alkylbenzyl containing 1 to 3 alkyl groups of 1 to 4 carbon atoms; or (IV):

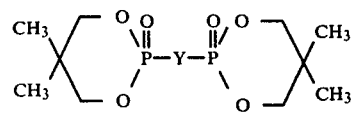  (IV)

wherein Y is

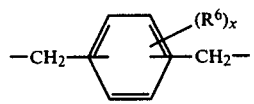

wherein $R^6$ is alkyl of 1 to 4 carbon atoms and x is an integer from 0 to 4; said mixture containing said component (A) and (B) in a weight ratio of from about 1:3 to 3:1.

2. The composition of claim 1 wherein said blend comprises about 50 to 80 parts by weight of polyphenylene ether resin and about 50 to 20 parts by weight of polystyrene.

3. The composition of claim 1 wherein said blend comprises about 50 parts by weight of polyphenylene ether resin and about 50 parts by weight of polystyrene.

4. The composition of claim 1 wherein said mixture of (A) and (B) is present in said blend in an amount of at least about 4% by weight.

5. The composition of claim 4 wherein the ratio of said (A) to (B) is about 1:1.

6. The composition of claim 1 wherein the phosphine oxide is of the formula

7. The composition of claim 1 wherein the phosphine oxide is of the formula

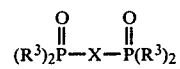

8. The composition of claims 1, 6 or 7 wherein the phosphonate is of the formula

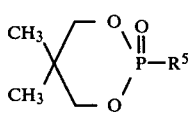

9. The composition of claims 1, 6 or 7 wherein the phosphonate is of the formula

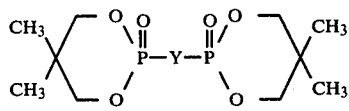

10. The composition of claim 1 wherein the phosphine oxide is tris2-(cyanoethyl)phosphine oxide.

11. The composition of claims 1 or 10 wherein the phosphonate is benzyl neopentylene phosphonate.

12. The composition of claim 1 wherein the phosphine oxide is selected from the group consisting of tris(2-cyanoethyl)phosphine oxide, tris(benzyl)phosphine oxide, triphenylphosphine oxide, tris(p-chlorophenyl)phosphine oxide, tris(n-octyl)phosphine oxide, benzylbis(cyclohexyl)phosphine oxide, bis[(dicyclohexyl phosphinyl)methyl]terphthalate, ethylenebis[bis2-cyanoethyl)phosphine oxide], (2,3,5,6-tetramethyl-1,4-phenylenedimethylene)bis[bis(2-cyanoethyl)phosphine oxide], and benzyl bis(2-cyanoethyl)phosphine oxide.

13. The composition of claim 1 or 12 wherein the phosphonate is selected from the group consisting of benzyl neopentylene phosphonate, phenyl neopentylene phosphonate, (p-phenylenedimethylene)bis[2,2-dimethyltrimethylene phosphonate], (2,5-dimethyl-1,4-phenylenedimethylene)bis-[2,2-dimethyltrimethylene phosphonate], and 2,4,6-trimethylbenzyl neopentylene phosphonate.

* * * * *